(12) United States Patent
Park et al.

(10) Patent No.: US 11,024,886 B2
(45) Date of Patent: Jun. 1, 2021

(54) ELECTRODE ASSEMBLY HAVING PLURALITY OF LITHIUM METAL SHEETS OR LITHIUM ALLOY SHEETS FOR LITHIUM SECONDARY BATTERY, AND LITHIUM SECONDARY BATTERY AND BATTERY MODULE INCLUDING SAME

(71) Applicant: LG CHEM, LTD., Seoul (KR)

(72) Inventors: In Tae Park, Daejeon (KR); Doo Kyung Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 443 days.

(21) Appl. No.: 15/743,778

(22) PCT Filed: Nov. 30, 2016

(86) PCT No.: PCT/KR2016/013918
§ 371 (c)(1),
(2) Date: Jan. 11, 2018

(87) PCT Pub. No.: WO2017/146357
PCT Pub. Date: Aug. 31, 2017

(65) Prior Publication Data
US 2018/0212277 A1    Jul. 26, 2018

(30) Foreign Application Priority Data

Feb. 24, 2016  (KR) .................. 10-2016-0021618
Nov. 28, 2016  (KR) .................. 10-2016-0158987

(51) Int. Cl.
*H01M 10/0585*    (2010.01)
*H01M 4/38*    (2006.01)
(Continued)

(52) U.S. Cl.
CPC ....... *H01M 10/0585* (2013.01); *H01M 4/134* (2013.01); *H01M 4/38* (2013.01);
(Continued)

(58) Field of Classification Search
CPC .... H01M 10/0585; H01M 10/04; H01M 4/70; H01M 10/058; H01M 4/38; H01M 4/134;
(Continued)

(56) References Cited

U.S. PATENT DOCUMENTS 5,549,717 A    8/1996  Takeuchi et al.
8,871,379 B2   10/2014 Gan
(Continued)

FOREIGN PATENT DOCUMENTS

EP    2317591 A1    5/2011
IN    5627/CHE/2014    7/2016
(Continued)

OTHER PUBLICATIONS

Machine translation of JP 2005-149961, Yamano et al., 2005 (Year: 2005).*
(Continued)

*Primary Examiner* — Kwang Han
(74) *Attorney, Agent, or Firm* — Birch, Stewart, Kolasch & Birch, LLP

(57) ABSTRACT

The present invention relates to an electrode assembly for a lithium secondary battery, a lithium secondary battery and a battery module comprising the same, and in particular, to an electrode assembly for a lithium secondary battery capable of, by changing a form of a lithium negative electrode current collector and thereby minimizing an interface of the negative electrode current collector exposed to a electrolyte, fundamentally blocking a corrosion reaction focusing on the negative electrode current collector caused by the liquid electrolyte in the art, and a lithium secondary battery and a battery module including the same.

18 Claims, 7 Drawing Sheets

(51) Int. Cl.
*H01M 10/052* (2010.01)
*H01M 10/04* (2006.01)
*H01M 4/70* (2006.01)
*H01M 10/058* (2010.01)
*H01M 4/134* (2010.01)
*H01M 4/40* (2006.01)
*H01M 4/66* (2006.01)

(52) U.S. Cl.
CPC ........... *H01M 4/382* (2013.01); *H01M 4/405* (2013.01); *H01M 4/661* (2013.01); *H01M 4/663* (2013.01); *H01M 4/667* (2013.01); *H01M 4/70* (2013.01); *H01M 10/04* (2013.01); *H01M 10/052* (2013.01); *H01M 10/058* (2013.01); *H01M 4/662* (2013.01)

(58) Field of Classification Search
CPC ...... H01M 4/405; H01M 4/661; H01M 4/663; H01M 4/667; H01M 4/382; H01M 10/052; H01M 4/662; H01M 2/1016; H01M 4/62; H01M 10/0413; H01M 10/0436; H01M 50/20; Y02E 60/122; Y02E 60/10
See application file for complete search history.

(56) References Cited

U.S. PATENT DOCUMENTS

| | | |
|---|---|---|
| 2002/0037457 A1 | 3/2002 | Choi |
| 2005/0147891 A1 | 7/2005 | Mikhaylik |
| 2005/0238956 A1 | 10/2005 | Lee |
| 2005/0284750 A1 | 12/2005 | Nishimura et al. |
| 2009/0197170 A1 | 8/2009 | Viavattine |
| 2011/0104542 A1* | 5/2011 | Gan ............ H01M 6/16 429/96 |
| 2011/0250485 A1 | 10/2011 | Tsukuda |
| 2013/0004845 A1 | 1/2013 | Tamaki et al. |
| 2014/0127572 A1 | 5/2014 | Ozaki et al. |
| 2014/0205912 A1* | 7/2014 | Skotheim ........ H01M 4/0421 429/313 |
| 2014/0242441 A1 | 8/2014 | Kwon et al. |
| 2014/0377657 A1 | 12/2014 | Lim et al. |
| 2015/0064529 A1 | 3/2015 | Nagai et al. |
| 2015/0333307 A1 | 11/2015 | Thokchom et al. |
| 2016/0087280 A1 | 3/2016 | Toyama et al. |

FOREIGN PATENT DOCUMENTS

| | | | |
|---|---|---|---|
| JP | 6-29894 Y2 | 8/1994 | |
| JP | 7-85865 A | 3/1995 | |
| JP | 8-37010 A | 2/1996 | |
| JP | 11-195415 A | 7/1999 | |
| JP | 2002-42894 A | 2/2002 | |
| JP | 2005-149961 A | 6/2005 | |
| JP | 2010-212092 A | 9/2010 | |
| JP | 2011-48991 A | 3/2011 | |
| JP | 2012-14886 A | 1/2012 | |
| JP | 2012-146549 * | 8/2012 | ............ Y02E 60/10 |
| JP | 2012-146549 A | 8/2012 | |
| JP | 2013-222612 A | 10/2013 | |
| JP | 5397715 B2 | 1/2014 | |
| JP | 2014-507767 A | 3/2014 | |
| JP | 5541957 B2 | 7/2014 | |
| JP | 2015-106486 A | 6/2015 | |
| JP | 5729588 B2 | 6/2015 | |
| KR | 10-2002-0059181 A | 7/2002 | |
| KR | 10-2005-0055655 A | 6/2005 | |
| KR | 10-2005-0096926 A | 10/2005 | |
| KR | 10-2006-0125852 A | 12/2006 | |
| KR | 10-2008-0039035 A | 5/2008 | |
| KR | 10-2014-0026806 A | 3/2014 | |
| KR | 10-2015-0004367 A | 1/2015 | |
| KR | 10-1502832 B1 | 3/2015 | |
| KR | 10-2015-0134385 A | 12/2015 | |
| WO | WO 2015/022529 A1 | 2/2015 | |

OTHER PUBLICATIONS

Machine translation of JP 2012-146549, Endo et al., 2012 (Year: 2012).*
Azimi et al., "Fluorinated Electrolytes for Li—S Battery: Suppressing the Self-Discharge with an Electrolyte Containing Fluoroether Solvent", J. Electrochem. Soc. 2015, vol. 162, Issue 1, pp. A64-A68.
International Search Report, issued in PCT/KR2016/013918, dated Mar. 8, 2017.
Shin et al., "Polysulfide dissolution control: the common ion effect", Chem. Commun., 2013, vol. 49, pp. 2004-2006.
Indian Office Action for Indian Application No. 201817006212, dated Jan. 29, 2020, with English translation.
Extended European Search Report, dated Aug. 23, 2018, for European Application No. 16891759.9.

* cited by examiner (a)

(b)

(c)

(d)

ELECTRODE ASSEMBLY HAVING PLURALITY OF LITHIUM METAL SHEETS OR LITHIUM ALLOY SHEETS FOR LITHIUM SECONDARY BATTERY, AND LITHIUM SECONDARY BATTERY AND BATTERY MODULE INCLUDING SAME

TECHNICAL FIELD

This application claims priority to and the benefits of Korean Patent Application No. 10-2016-0021618, filed with the Korean Intellectual Property Office on Feb. 24, 2016, and Korean Patent Application No. 10-2016-0158987, filed with the Korean Intellectual Property Office on Nov. 28, 2016, the entire contents of which are incorporated herein by reference.

The present invention relates to an electrode assembly for a lithium secondary battery having an improved negative electrode structure, and a lithium secondary battery and a battery module including the same.

BACKGROUND ART

With rapid development of electronics, communications and computer industries, application fields of energy storage technologies have expanded to camcorders, mobile phones, laptops, PCs, and furthermore, to electric vehicles. Accordingly, development of high performance secondary batteries that are light, usable for a long period of time and highly reliable has been in progress.

As batteries satisfying such requirements, lithium secondary batteries have received attention.

A lithium secondary battery has a structure of laminating or winding an electrode assembly including a positive electrode, a negative electrode, and a separator interposed therebetween, and is formed by embedding this electrode assembly in a battery case, and injecting an electrolyte thereinto. The lithium secondary battery produces electric energy through an oxidation and reduction reaction when lithium ions are intercalated/deintercalated in the positive electrode and the negative electrode.

A negative electrode of a lithium secondary battery generally has a form of laminating a lithium sheet on a copper foil current collector. When bringing this negative electrode into contact with a liquid electrolyte, the liquid electrolyte penetrates into an interface between the lithium sheet/negative electrode current collector, and an intensive corrosion reaction occurs. Lithium stability decreases due to the corrosion reaction leading to a problem of forming crystalline or amorphous layer structure on the negative electrode surface or locally increasing a temperature due to the exothermic reaction.

In view of such a problem, Korean Patent Publication No. 2006-0125852 proposed a technology of forming a protective layer including an additive such as lithium nitrate ($LiNO_3$) on an electrode surface. Such a method may resolve the above-mentioned problem, but, due to the formation of a separate protective layer on the electrode, causes a process addition, a battery weight increase, and a cost increase resulted therefrom.

Accordingly, a method of using an insulating tape on an existing structure was proposed instead of adding a functional layer such as the protective layer. Considering that common negative electrode current collectors are manufactured in a larger size than a lithium sheet, and the corrosion reaction seriously occurs particularly at an interface between the lithium sheet/negative electrode current collector, a method of attaching an insulating tape to an outer circumference surface of the negative electrode current collector not adjoining the lithium sheet, or forming an insulating layer was proposed. However, cost aspects caused by the insulating tape/insulating layer formation or process addition were not able to be ignored.

Meanwhile, among lithium secondary batteries, lithium-sulfur batteries using a sulfur series material as a positive electrode active material have recently received much attention. A lithium-sulfur battery has theoretical discharge capacity of 1,672 mAh/g-sulfur and theoretical energy density of 2,600 Wh/kg, which is very high compared to theoretical energy density of other battery systems (Ni-MH battery: 450 Wh/kg, Li—FeS battery: 480 Wh/kg, Li—$MnO_2$ battery: 1,000 Wh/kg, Na—S battery: 800 Wh/kg) currently studied, and has received attention as a battery having a high energy density property.

However, obtaining such a theoretical value has limits in various aspects when actually using the lithium-sulfur battery.

Main problems of the lithium-sulfur battery are fundamentally due to unique shuttle mechanism caused by polysulfide dissolution inducing an inactive reaction for oxidation and reduction of sulfur. In other words, when a shuttle phenomenon in which polysulfide, a water-soluble intermediate formed with a sulfur chain having lithium at the end, is consumed inside a battery while diffusing between a positive electrode and a negative electrode without being utilized occurs frequently, a continuous current flow is caused in the battery, a product discharged therefrom is deposited on the electrode surface, or dissolved polysulfide is not able to be recycled to sulfur, and as a result, discharge capacity decreases. Such a phenomenon is referred to as self-discharge, and as one of main reasons reducing battery usage efficiency, this has received attention as an important subject to be resolved.

In view of the above, various attempts have been progressed for improving self-discharge of a lithium-sulfur battery.

As one of methods changing an electrolyte composition, Eon Sung Shin et. al. disclosed that self-discharge may be suppressed through reducing a wetting property for a positive electrode by using a highly concentrated salt (common ion effect) or a polymer electrolyte, and reducing solubility of sulfur (or polysulfide) through the common ion effect. However, this method has produced a new problem of declining reactivity of sulfur, a positive electrode active material, due to the use of highly concentrated electrolyte.

In addition, Nasim Azimi et. al. attempted to suppress self-discharge through reducing solubility of sulfur (or polysulfide) by using fluorine-based ether and ionic liquid as an electrolyte composition. Effects of suppressing/preventing self-discharge of a lithium-sulfur battery have been secured to some degree by changing the electrolyte composition as above, however, this method has a disadvantage in that specific electrolyte components need to be used.

Accordingly, in batteries using a lithium negative electrode, development of methods capable of relatively simplifying a process and securing competitiveness in terms of costs while minimizing the corrosion reaction at the interface between lithium sheet/negative electrode current collector and minimizing the self-discharge reaction of sulfur in the battery using sulfur as a positive electrode has been urgently required.

PRIOR ART DOCUMENTS

Patent Documents

Korean Patent Publication No. 2006-0125852, (2006 Dec. 6), Electrolytes for Lithium Sulfur Cells
Korean Patent Publication No. 2005-0096926, (2005 Oct. 6), Collector Sheet and Electrochemical Device

Non-Patent Documents

Eon Sung Shin et al., Polysulfide dissolution control: the common ion effect, *Chem. Commun.*, 2013, 49, 2004-2006
Nasim Azimi, et al, Fluorinated Electrolytes for Li—S Battery: Suppressing the Self-Discharge with an Electrolyte Containing Fluoroether Solvent, *J. Electrochem. Soc.*, 162 A64 (2015)

DISCLOSURE

Technical Problem

In view of the above, the applicant of the present invention has, based on the idea that possibility of an electrode corrosion reaction and a self-discharge may be fundamentally prevented when blocking a contact between a lithium metal/negative electrode current collector interface and an electrolyte, changed only the form of the negative electrode current collector without forming a functional layer on the electrode or changing the electrolyte composition. As a result, the applicant of the present invention has identified that charge and discharge properties of a lithium secondary battery are improved and the lithium secondary battery may be manufactured in a cost-effective way, and has completed the present invention.

Accordingly, an object of the present invention provides an electrode assembly for a lithium secondary battery having a newly changed negative electrode current collector structure.

Another object of the present invention provides a lithium secondary battery provided with the electrode assembly for a lithium secondary battery.

In addition, still another object of the present invention provides a battery module and a battery pack provided with the electrode assembly for a lithium secondary battery.

Technical Solution

According to an object of the present invention, there is provided an electrode assembly for a lithium secondary battery comprising a plurality of negative electrodes having a negative electrode mixture laminated on both sides of a negative electrode current collector; a plurality of positive electrodes having a positive electrode mixture laminated on both sides of a positive electrode current collector; and a separator provided between the negative electrode and the positive electrode, wherein the negative electrode mixture is a lithium metal sheet, and has a larger area than an area of the negative electrode current collector.

The negative electrode current collector may have an area of greater than 0% and less than to 100% with respect to an area of the lithium negative electrode mixture.

According to another object of the present invention, there is provided a lithium secondary battery provided with the electrode assembly for a lithium secondary battery.

The lithium secondary battery may be a lithium-sulfur battery.

According to still another object of the present invention, there is provided a battery module and a battery pack provided with the lithium secondary battery.

Advantageous Effects

An electrode assembly for a lithium secondary battery according to the present invention has an advantage in that a corrosion reaction does not occur, and charge and discharge properties are enhanced since self-discharge does not occur when using sulfur as a positive electrode.

Particularly, there is an advantage in that, by simply changing the form of a negative electrode current collector without a new functional layer or adding a composition inside the electrode assembly, the application is readily linked to an existing lithium secondary battery manufacturing process while being economical.

BEST MODE

Hereinafter, the present invention will be described in more detail with reference to accompanying drawings.

Figure 1:
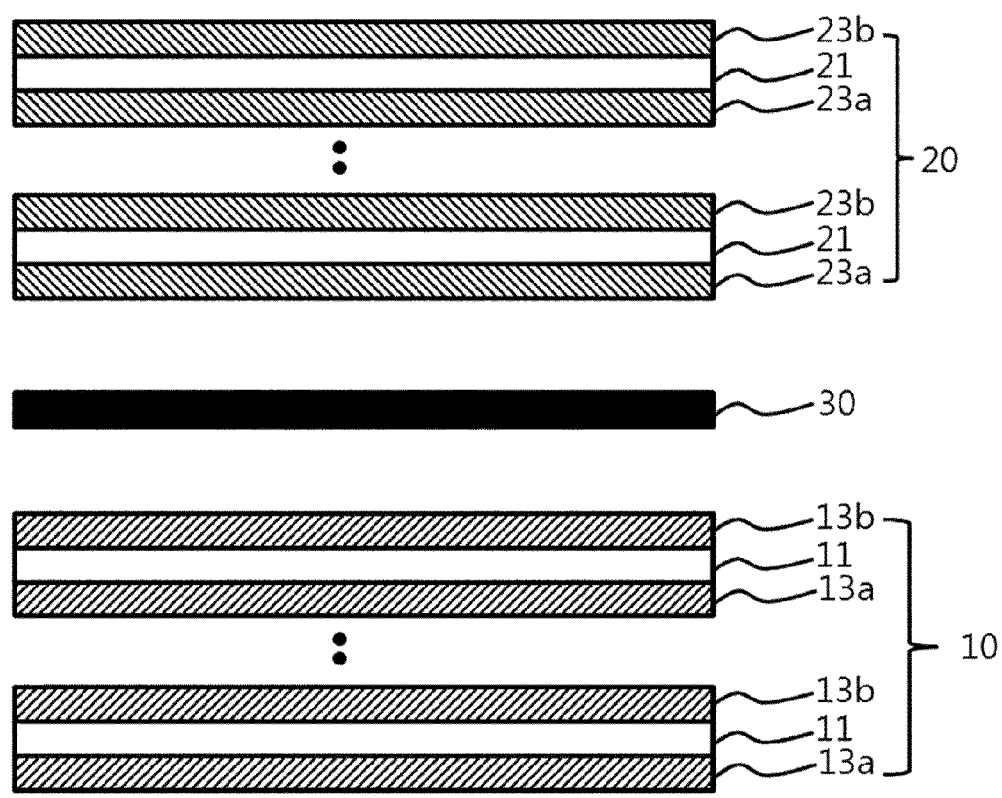
FIG. 1 is a sectional diagram of an electrode assembly according to one embodiment of the present invention.

FIG. 1 is a sectional diagram of an electrode assembly (100) according to one embodiment of the present invention. When referring to FIG. 1, the electrode assembly (100) is provided with a negative electrode (10), a positive electrode (20) and a separator (30) interposed therebetween.

The negative electrode (10) has negative electrode mixtures (13a, 13b) laminated on both sides of a negative electrode current collector (11), and such a structure is laminated in plural numbers.

The positive electrode (20) has positive electrode mixtures (23a, 23b) laminated on both sides of a positive electrode current collector (21), and such a structure is laminated in plural numbers.

The separator (30) is interposed between the negative electrode (10) and the positive electrode (20) of the electrode assembly (100), and an electrolyte (not shown) is filled in the electrode assembly (100).

In the electrode assembly (100) having a structure of FIG. 1, the present invention fundamentally blocks an electrode corrosion reaction and a self-discharge opportunity by changing the negative electrode (10), particularly a form, an area among these, of the negative electrode current collector (11), and through changes in the area of a specific range with respect to the negative electrode mixtures (13a, 13b).

The negative electrode current collector (11) provided in the present invention is not particularly limited, and those with any known material and form may be used.

Specifically, the negative electrode current collector (11) is not particularly limited as long as it has conductivity without inducing chemical changes in the corresponding battery. For example, the negative electrode current collector (11) may include copper, stainless steel, aluminum, nickel, titanium, baked carbon, copper or stainless steel of which surface is treated with carbon, nickel, titanium, silver and the like, aluminum-cadmium alloys, and the like.

In addition, as the negative electrode current collector (11), various forms such as films with/without micro-unevenness formed on the surface, sheets, foil, nets, porous bodies, foams and non-woven fabrics may be used. Copper foil is most preferred as the negative electrode current collector (11).

The negative electrode mixtures (13a, 13b) provided in the present invention may be a lithium metal or a lithium alloy. The lithium alloy includes an element capable of alloying with lithium, and the element may be Si, Sn, C, Pt, Ir, Ni, Cu, Ti, Na, K, Rb, Cs, Fr, Be, Mg, Ca, Sr, Sb, Pb, In, Zn, Ba, Ra, Ge, Al, Sn or an alloy thereof.

In addition, the negative electrode mixtures (13a, 13b) may be a lithium metal sheet.

Figure 2:
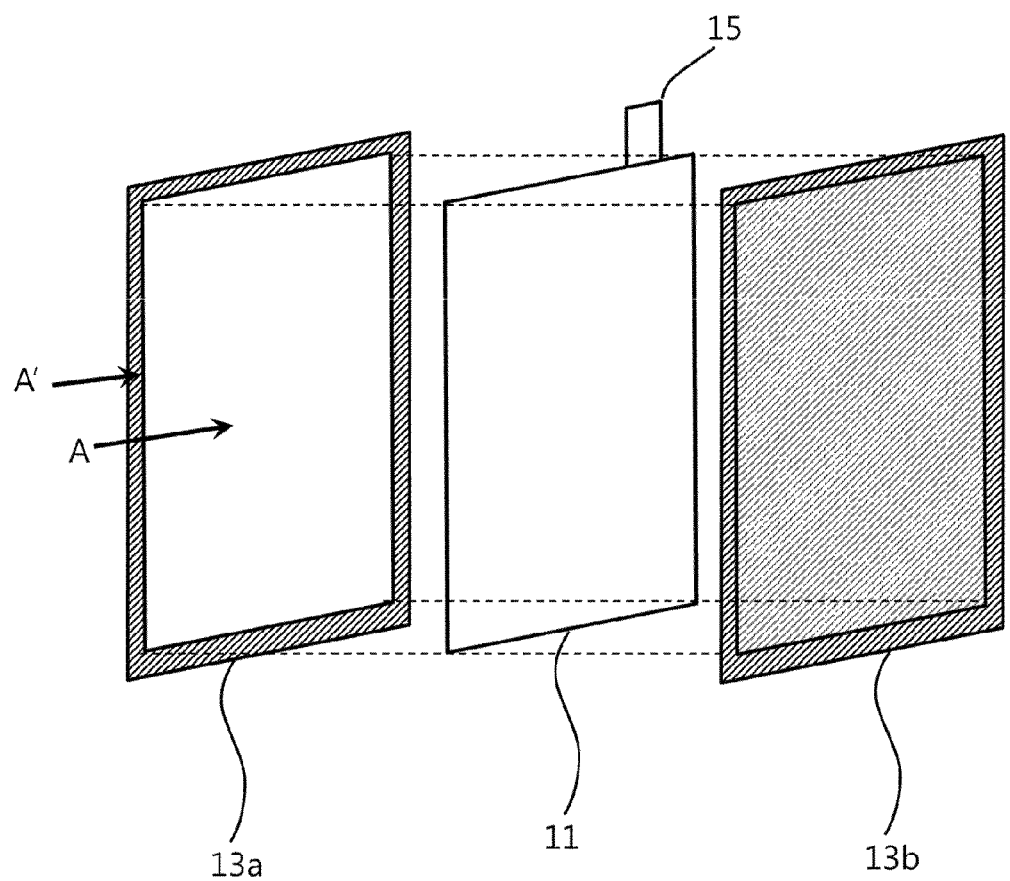
FIG. 2 is a mimetic diagram illustrating a negative electrode structure according to one embodiment of the present invention.
Figure 3:
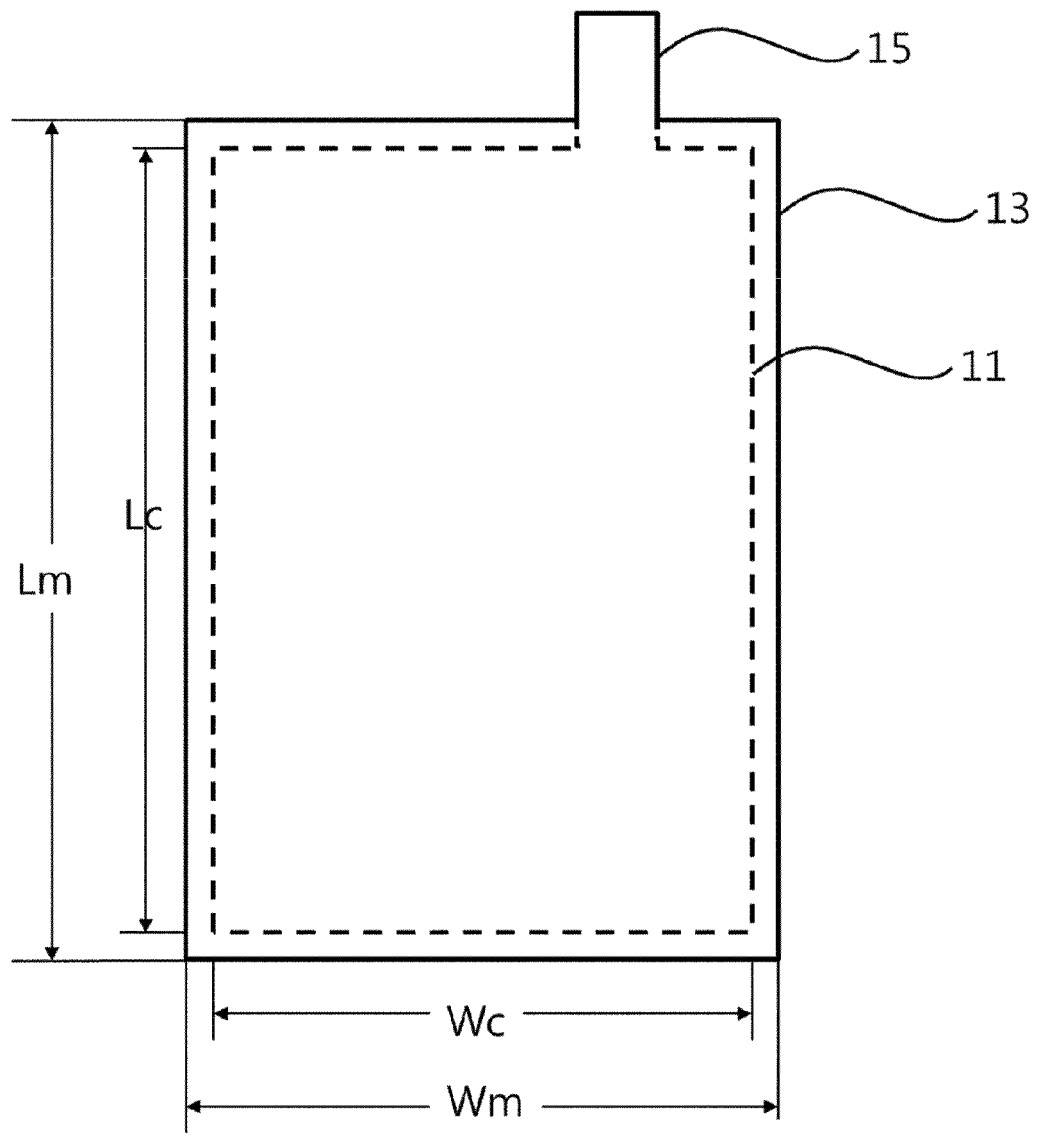
FIG. 3 is a mimetic diagram illustrating a change in the size of a negative electrode current collector.

The changes in the area of the negative electrode current collector (11) with respect to the negative electrode mixtures (13a, 13b) may be described as shown in FIG. 2 and FIG. 3.

FIG. 2 and FIG. 3 are mimetic diagrams illustrating a structure of a negative electrode (10) according to one embodiment of the present invention. When referring to FIG. 2, in the negative electrode (10), the negative electrode mixtures (13a, 13b) are laminated on both sides with the negative electrode current collector (11) provided with a tap (15) on one side for current carrying in between.

The negative electrode current collector (11) is formed smaller than the negative electrode mixtures (13a, 13b), and the negative electrode mixtures (13a, 13b) corresponding to a slashed region (A') except for the region (A) corresponding to the negative electrode current collector (11) adjoin each other. The lithium metal sheet used as the negative electrode mixture (13a, 13b) material has excellent flexibility, and may be laminated by physical applications from the outside to form a sealed structure. Such a sealed structure performs a role of either blocking or greatly reducing direct contact opportunities between the electrolyte present outside the negative electrode (10) and the negative electrode current collector (11).

When referring to FIG. 3, the area of the negative electrode current collector (11) is smaller than the area of the negative electrode mixture (13a, 13b), and is preferably greater than 0% and less than 100%, more preferably from 30% to 99.9%, even more preferably from 40% to 97%, and most preferably from 45% to 95% with respect to the area of the negative electrode mixture (13a, 13b).

The negative electrode current collector (11) may be disposed in any place as long as it is a place in contact with the negative electrode mixtures (13a, 13b), but preferably, considering reaction uniformity and the like, it is advantageous to dispose that the center line of the negative electrode current collector (11) is matched to the center lines of the negative electrode mixtures (13a, 13b).

The negative electrode current collector (11) having an area smaller than the area of the negative electrode mixture (13a, 13b) may be controlled through adjusting the length and the width.

Figure 4:
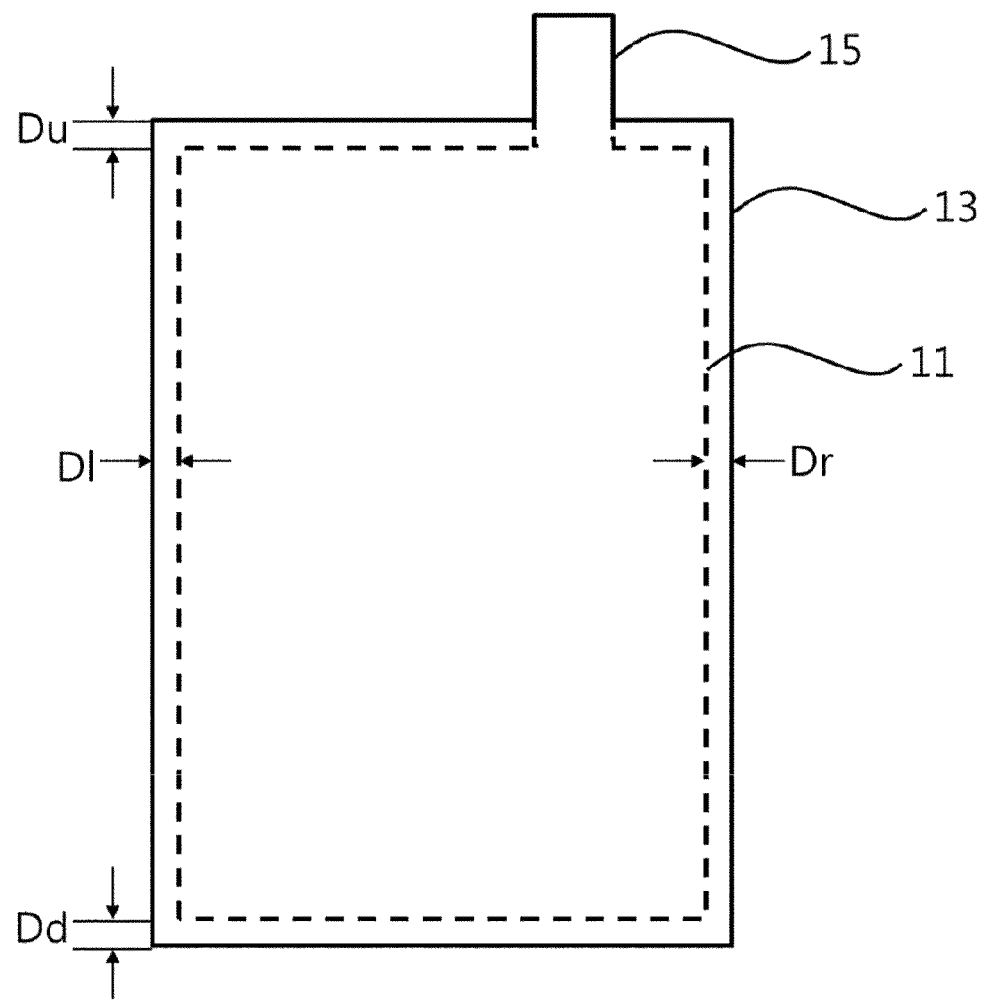
FIG. 4 is a mimetic diagram for describing lengths and widths between a lithium metal sheet and a negative electrode current collector according to the present invention.

FIG. 4 is a mimetic diagram for describing lengths and widths between the negative electrode mixture (13) and the negative electrode current collector (11) according to the present invention.

When referring to FIG. 4, the following Mathematical Formula 1 is satisfied when a width in a horizontal direction of the negative electrode current collector (11) is employed as Wc (width of collector) and a width of the negative electrode mixture (13) is employed as Wm (width of lithium metal).

$$0 < Wc/Wm < 1.0 \qquad \text{[Mathematical Formula 1]}$$

Wherein Wc is a width in a horizontal direction of the negative electrode current collector (11), and Wm is a width in a horizontal direction of the negative electrode mixture (13).

According to the Mathematical Formula 1, the width of the negative electrode current collector (11) is smaller than the width of the negative electrode mixture (13), and the width ratio may be greater than a minimum of 0 and less than a maximum of 1, preferably from 0.5 to 0.999 and more preferably from 0.75 to 0.97.

In addition, in FIG. 4, the following Mathematical Formula is satisfied when a length in a vertical direction of the negative electrode current collector (11) is employed as Lc (length of collector) and a length of the negative electrode mixture (13) is employed as Lm (length of lithium metal).

$$0 < Lc/Lm < 1.0 \qquad \text{[Mathematical Formula 2]}$$

Wherein Lc is a length in a vertical direction of the negative electrode current collector (11), and Lm is a length in a vertical direction of the negative electrode mixture (13).

According to the Mathematical Formula 2, the length of the negative electrode current collector (11) is smaller than the length of the negative electrode mixture (13), and the length may be greater than a minimum of 0 and less than a maximum of 1, preferably from 0.5 to 0.999 and more preferably from 0.75 to 0.97.

The negative electrode current collector (11) which is limited width and length so as to satisfy the Mathematical Formulae 1 and 2 is disposed to face the negative electrode mixture (13). And the negative electrode current collector (11) may be disposed while being separated by a certain distance from an outer circumference surface of the negative electrode mixture (13).

Such a separated disposition may occur in one or more positions of upper side, lower side, left side and right side of the negative electrode mixture (13), and binding between the negative electrode mixtures (13) may occur in the region separated by this separated disposition to secure a negative electrode (10) structure in which one or more sides are sealed.

Figure 5:
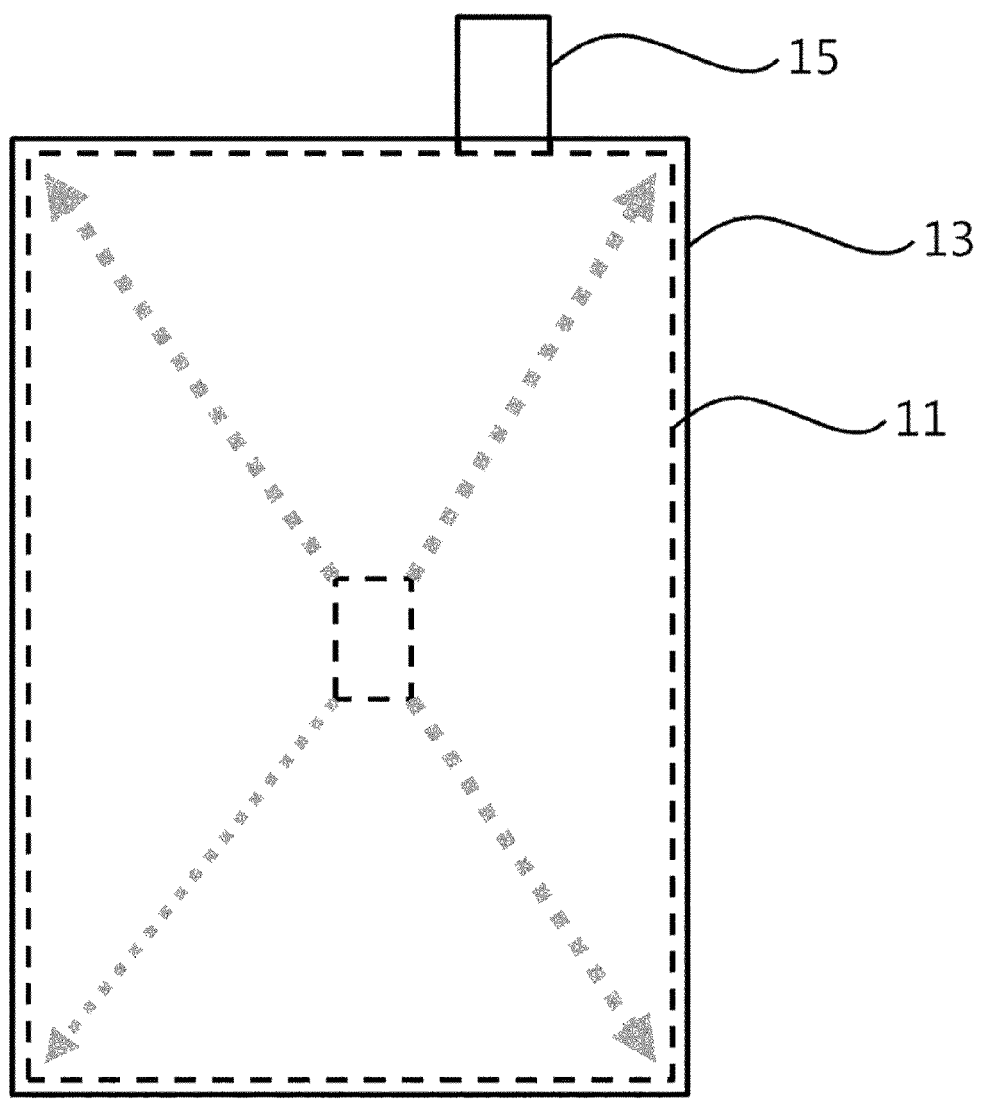
FIG. 5 is a mimetic diagram showing binding states of a lithium metal sheet and a negative electrode current collector according to various embodiments of the present invention.

When referring to FIG. 5, the negative electrode current collector (11) may be disposed while being separated by a certain distance from the left side end of the negative electrode mixture (13), and a separation distance from the upper outer circumference surface (Du, distance from up) satisfies the following Mathematical Formula 3.

$$Du = 1 - (Wc/Wm) \qquad \text{[Mathematical Formula 3]}$$

Wherein Du is an upper side separation distance of the negative electrode current collector (11), Wc is a width in a horizontal direction of the negative electrode current collector (11), and Wm is a width in a horizontal direction of the negative electrode mixture (13).

The separation distance from the upper outer circumference surface (Du) of the negative electrode current collector (11) defined in the Mathematical Formula 3 is preferably a certain distance or longer so that binding between the negative electrode mixtures (11) sufficiently occurs in the region. So as to satisfy the Mathematical Formula 3, Du may be greater than or equal to 0 and less than 1, and preferably, values of the Wc and the Wm defined in the Mathematical Formula 1 are satisfied.

In the same manner, in the negative electrode current collector (11), a separation distance from the lower outer circumference surface (Dd), a separation distance from the left outer circumference surface (Dl), and a separation distance from the right outer circumference surface (Dr) of the negative electrode mixture (13) satisfy the following Mathematical Formulae 4 to 6:

$$Dr=1-(Wc/Wm) \quad \text{[Mathematical Formula 4]}$$

Wherein Dr is a right side separation distance of the negative electrode current collector (11), Wc is a width in a horizontal direction of the negative electrode current collector (11), and Wm is a width in a horizontal direction of the negative electrode mixture (13).

$$Du=1-(Lc/Lm) \quad \text{[Mathematical Formula 5]}$$

Wherein Du is an upper side separation distance of the negative electrode current collector (11), Lc is a length in a vertical direction of the negative electrode current collector (11), and Lm is a length in a vertical direction of the negative electrode mixture (13).

$$Dd=1-(Lc/Lm) \quad \text{[Mathematical Formula 6]}$$

Wherein Dd is a lower side separation distance of the negative electrode current collector (11), Lc is a length in a vertical direction of the negative electrode current collector (11), and Lm is a length in a vertical direction of the negative electrode mixture (13).

When referring to the Mathematical Formulae 3 to 6, the negative electrode current collector (11) may be disposed while being separated by a certain distance from one side of the negative electrode mixture (13), and the negative electrode mixtures (13) can bind to each other in the region corresponding to the separated certain distance.

Figure 6:
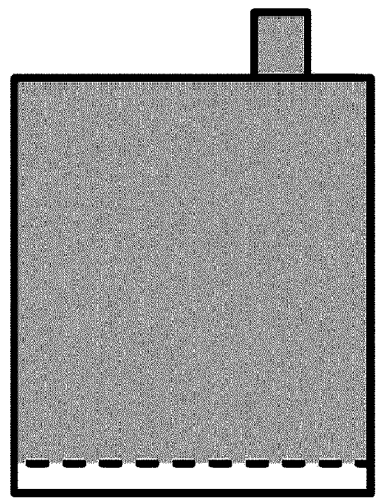
FIG. 6 is a mimetic diagram for describing a separation distance of a negative electrode current collector with respect to a lithium metal sheet according to the present invention.
Figure 6:
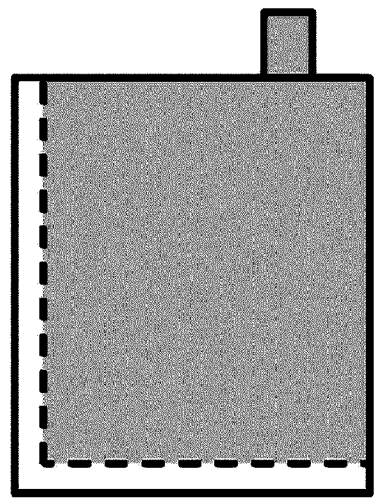
Figure 6:
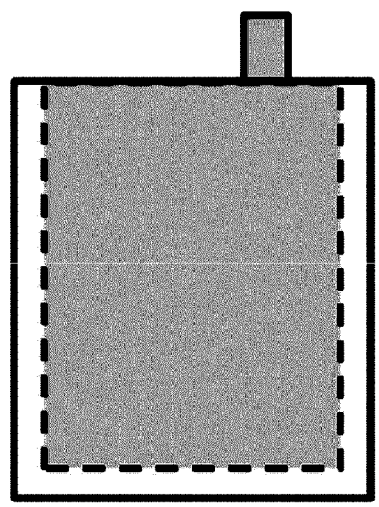
Figure 6:
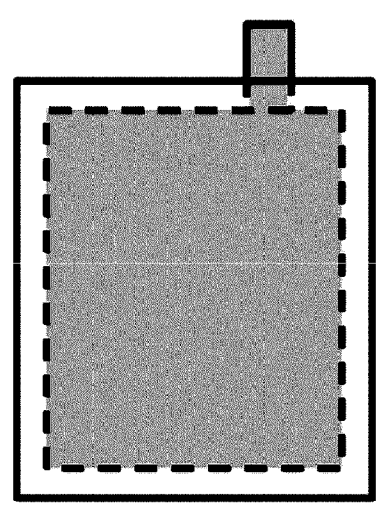

FIG. 6 is a mimetic diagram showing binding states of the negative electrode mixture (13) and the negative electrode current collector (11) according to various embodiments according to the present invention, and structures sealed through binding between the negative electrode mixtures (13) in one or more sides are obtained.

FIG. 6(a) shows an embodiment where the horizontal width of the negative electrode current collector (11) and the horizontal width of the negative electrode mixture (13) are the same, and the vertical length of the negative electrode current collector (11) is smaller than the vertical length of the negative electrode mixture (13). And herein when the negative electrode current collector (11) is disposed while being separated by a certain distance from a lower side of the negative electrode mixture (13), binding between the negative electrode mixtures (13) occurs in the lower side region.

FIG. 6(b) shows an embodiment where the horizontal width and the vertical length of the negative electrode current collector (11) are smaller than the horizontal width and the vertical length of the negative electrode mixture (13). And in the embodiment of FIG. 6(b), when the negative electrode current collector (11) is disposed while being separated by a certain distance from a lower side and a left side of the negative electrode mixture (13), binding between the negative electrode mixtures (13) occurs in the lower side region and the left side region.

FIG. 6(c) shows an embodiment where the horizontal width and the vertical length of the negative electrode current collector (11) are smaller than the horizontal width and the vertical length of the negative electrode mixture (13) And herein, when the negative electrode current collector (11) is disposed while being separated by a certain distance from a lower side, a left side and a right side of the negative electrode mixture (13), binding between the negative electrode mixtures (13) occurs in the lower side region, the left side region and the right side region.

FIG. 6(d) shows an embodiment where the horizontal width and the vertical length of the negative electrode current collector (11) are smaller than the horizontal width and the vertical length of the negative electrode mixture (13). And in the embodiment of FIG. 6(d), when the negative electrode current collector (11) is disposed while being separated by a certain distance from an upper side, a lower side, a left side and a right side of the negative electrode mixture (13) and the center points are matched in the disposition, binding between the negative electrode mixtures (13) occurs in all the 4 surfaces, and a negative electrode (10) having a most efficient sealing structure may be prepared.

The electrode assembly (100) according to the present invention shown in FIG. 1 may further include a positive electrode (20) and a separator (30) in addition to the negative electrode (10) described above. Such a constitution is not particularly limited in the present invention, and follows constitutions known in the art.

The positive electrode according to the present invention may comprise a positive electrode active material formed on a positive electrode current collector.

The positive electrode current collector is not particularly limited as long as it has high conductivity without inducing chemical changes in a battery, and examples thereof may include stainless steel, aluminum, nickel, titanium, baked carbon, or aluminum or stainless steel of which surface is treated with carbon, nickel, titanium, silver and the like.

The positive electrode active material may vary depending on the application of a lithium secondary battery, and known materials are used as the specific composition. As one example, the positive electrode active material may comprise lithium cobalt-based oxides, lithium manganese-based oxides, lithium copper oxides, lithium nickel-based oxides and lithium manganese composite oxides, lithium-nickel-manganese-cobalt-based oxides, elemental sulfur ($S_8$), sulfur series compounds or mixtures thereof. The sulfur series compound may specifically be $Li_2S_n$ (n≥1), an organo-sulfur compound, a carbon-sulfur polymer (($C_2S_x)_n$: x=2.5 to 50, n≥2) or the like. These may be used as a composite with a conductive material since a sulfur material alone does not have electrical conductivity.

The conductive material may be porous. Accordingly, as the conductive material, those having porosity and conductivity may be used without limit, and for example, carbon-based materials having porosity may be used. As such carbon-based materials, carbon black, graphite, graphene, active carbon, carbon fiber and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

The positive electrode may further include a binder for binding of the positive electrode active material and the conductor and for binding on the current collector. The binder may comprise a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoroethylene copolymer, an ethylene-acrylic acid copolymer and the like may be used either alone or as a mixture, however, the binder is not limited thereto, and those capable of being used as a binder in the art may all be used.

The positive electrode may be prepared using common methods, and specifically, may be prepared by coating a composition for forming a positive electrode active material layer prepared by mixing the positive electrode active material, the conductive material and the binder in an organic solvent on a current collector and drying the result, and selectively, compression molding the result on the current collector for enhancing electrode density. As the organic solvent, those capable of uniformly dispersing the positive electrode active material, the binder and the conductive material, and readily evaporating are preferably used. Specifically, acetonitrile, methanol, ethanol, tetrahydrofuran, water, isopropyl alcohol and the like may be included.

A conventional separator may be interposed between the positive electrode and the negative electrode. The separator is a physical separator having a function of physically separating the electrodes, and those conventionally used as a separator may be used without particular limit, and particularly, those having an excellent electrolyte moisture retention ability while having low resistance for ion migration of the electrolyte are preferred.

In addition, the separator enables lithium ion transfer between the positive electrode and the negative electrode while separating or insulating the positive electrode and the negative electrode from each other. The separator may be formed with porous, and non-conductive or insulating materials. The separator may be an independent member such as a film, or a coating layer added to the positive electrode and/or the negative electrode.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used either alone or as laminates thereof, or common porous non-woven fabrics, for example, non-woven fabrics made of high melting point glass fiber or polyethylene terephthalate fiber may be used, however, the separator is not limited thereto.

The electrolyte of the lithium secondary battery is a lithium-salt containing electrolyte, and may be an aqueous or non-aqueous electrolyte, and is preferably a non-aqueous electrolyte formed with an organic solvent liquid electrolyte and a lithium salt. In addition, an organic solid electrolyte, an inorganic solid electrolyte or the like may be included, however, the liquid electrolyte is not limited thereto.

Examples of the non-aqueous organic solvent may include aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyltetrahydrofuran, dimethyl sulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ethers, methyl propionate or ethyl propionate.

Herein, ether-based solvents are used as the non-aqueous solvent so as to be similar to an electrode protective layer of the present invention, and examples thereof may include tetrahydrofuran, ethylene oxide, 1,3-dioxolane, 3,5-dimethyl isoxazole, 2,5-dimethylfuran, furan, 2-methylfuran, 1,4-oxane, 4-methyl dioxolane and the like.

The lithium salt may be a substance which can be easily dissolved in the non-aqueous electrolyte. For examples, the lithium salt may include LiCl, LiBr, LiI, $LiClO_4$, $LiBF_4$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, chloroborane lithium, lower aliphatic carboxylic acid lithium, lithium tetraphenylborate, imide and the like.

With the purpose of improving charge and discharge properties and flame retardancy, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride may also be added to the electrolyte of the present invention. In some cases, halogen-containing solvents such as carbon tetrachloride and trifluoroethylene may be further included in order to provide nonflammability, and carbon dioxide gas may be further included in order to enhance high temperature storage properties.

Additionally, an $NO_3$-based compound is used in the electrolyte as an additive. The $NO_3$-based compound is effective in forming a stable film in the lithium electrode and greatly enhancing charge and discharge efficiency. The $NO_3$-based compound is not particularly limited in the present invention, however, one selected from the group consisting of inorganic-based nitric acid compounds such as lithium nitrate ($LiNO_3$) or lithium nitrite ($LiNO_2$); organic based nitric acid compounds such as nitromethane ($CH_3NO_2$) or methyl nitrate ($CH_3NO_3$); and combinations thereof may be used, and preferably, lithium nitrate ($LiNO_3$) is used.

Meanwhile, the type of the electrode assembly (100) of the present invention is not particularly limited, and examples thereof may include a jelly-roll type, a stack type, a stack-folding type (including stack-Z-folding type), or a lamination-stack type, and may preferably be a stack-folding type.

The electrode assembly (100) is placed in a battery case, the electrolyte is injected to the top of the case, and the result is sealed with a cap plate and a gasket and then assembled to manufacture a lithium secondary battery.

Depending on the positive electrode material and the separator type, the lithium secondary battery may be divided into various batteries such as a lithium-sulfur battery, a lithium-air battery, a lithium-oxide battery or a lithium all-solid-state battery. And depending on the shape, the lithium secondary battery may be divided into a cylinder-type, a square-type, a coin-type, a pouch-type and the like. And depending on the size, the lithium secondary battery may be divided into a bulk type and a thin film type. Structures and manufacturing methods of these batteries are widely known in the art, and therefore, detailed descriptions thereof are not included.

Particularly, the lithium secondary battery according to the present invention may be a lithium-sulfur battery in which a positive electrode includes a sulfur (S) active material.

In the lithium-sulfur battery, sulfur forms polysulfide due to a reduction reaction when charged and discharged during battery operation, and this leads to self-discharge causing a decrease in the sulfur material amount participating in an electrochemical reaction in a positive electrode. And it resultantly becomes a main reason causing charge capacity decrease and energy decrease of the lithium-sulfur battery. This occurs more rapidly at an interface of a negative electrode mixture/negative electrode current collector when using a lithium sheet as a negative electrode mixture.

However, as described above, the self-discharge is effectively suppressed in the lithium-sulfur battery when using the negative electrode structure with adjusted area, length, width and separation distance of the negative electrode current collector improving charge and discharge properties of the battery.

The present invention may also provide a battery module including the lithium secondary battery cell as a unit cell.

The battery module of the present invention may include one or more of the battery cells according to the present invention, and have an operating voltage of 9.0 V to 16.2 V. In the present invention, the one battery module is preferably formed by mutually combining 5 to 12 lithium secondary battery cells as a unit cell.

According to an embodiment of the present invention, the unit cell is a lithium secondary battery cell of either the same kind or a different kind. Herein, the 'mutual combination' means a constitution of serial or combining serial and parallel. The 'same kind' means a positive electrode active material and a negative electrode active material used in a lithium secondary battery cell having the same materials and compositions, and the 'different kind' means at least one material of a positive electrode active material and a negative electrode active material used in a lithium secondary battery cell being different.

In the embodiment of the present invention, unit cells in the battery module are preferably all connected in series when the number of the unit cells is less than 7. Meanwhile, unit cells in the battery module are connected combining serial connection and parallel connection when the number of the unit cells is 7 or greater.

By diversely combining the same or different kinds of battery cells, a secondary battery module may be readily formed.

In addition, the present invention may provide a battery pack including the battery module according to the present invention described above.

The battery pack may be used as a power supply of a device requiring high temperature stability, a long cycle property and a high rate property. Specific examples of the device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including e-bikes, e-scooter and the like; electric golf carts; systems for power storage and the like, but are not limited thereto.

Hereinafter, examples, comparative examples and experimental examples are described in order to illuminate effects of the present invention. However, the following descriptions are just one example of contents and effects of the present invention, and the scope of a right and effects of the present invention are not limited thereto.

Example 1

A negative electrode was prepared by using a lithium sheet having a thickness of 150 μm as a negative electrode mixture, and laminating a negative electrode current collector (copper foil) having an area of 93% with respect to the negative electrode mixture thereto.

As for a positive electrode, a positive electrode active material was prepared by mixing 65% by weight of sulfur, 25% by weight of carbon black and 10% by weight of polyethylene oxide with acetonitrile. The positive electrode active material was coated on an aluminum current collector, and then dried to prepare a positive electrode.

The prepared positive electrode and negative electrode were positioned to face each other, a polyethylene separator was interposed therebetween, and then the result was filled with a electrolyte to prepare a lithium-sulfur battery. As the electrolyte, the electrolyte in which TEGDME:DOL:DME (tetraethylene glycol dimethyl ether:dioxolane:dimethyl ether) were each present in a volume ratio of 1:1:1, and 1.0 M lithium bis(trifluoromethane)sulfoimide (LiTFSI) and 1.0 M $LiNO_3$ were included was used.

Example 2

A lithium-sulfur battery was prepared in the same manner as in Example 1 except that the negative electrode was prepared using a negative electrode current collector having an area of 95% with respect to the negative electrode mixture area.

Example 3

A lithium-sulfur battery was prepared in the same manner as in Example 1 except that the negative electrode was prepared using a negative electrode current collector having an area of 98% with respect to the negative electrode mixture area.

Comparative Example 1

A lithium-sulfur battery was prepared in the same manner as in Example 1 except that the negative electrode was prepared using a negative electrode current collector having an area of 100% with respect to the negative electrode mixture area.

Experimental Example 1

Figure 7:
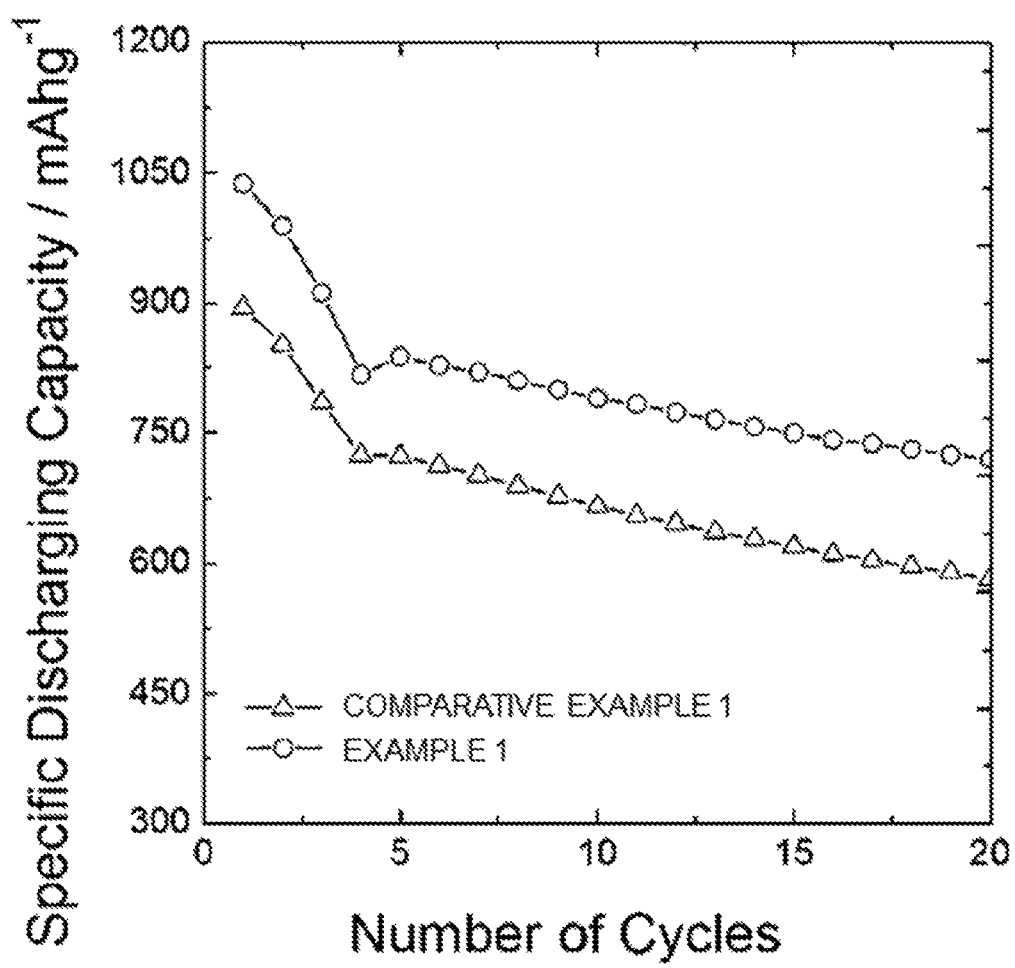
FIG. 7 is a graph comparing charge and discharge cycle properties of lithium-sulfur batteries manufactured in Example 1 and Comparative Example 1 of the present invention.

For the lithium-sulfur batteries prepared in Examples 1 to 3 and Comparative Example 1, changes in the charge and discharge properties when operating the batteries after resetting for 5 days were tested using a charge and discharge measuring device. Using each of the prepared batteries, charge and discharge were repeated 20 cycles each with 0.1 C/0.1 C charge/discharge to measure initial discharge capacity and a capacity retention rate (%) at the 20th cycle with respect to the initial capacity, and the results are shown in the following Table 1 and FIG. 7.

TABLE 1

| | Initial Discharge Capacity (mAh/g) |
|---|---|
| Example 1 | 1037.8 |
| Example 2 | 1035.7 |
| Example 3 | 1014.5 |
| Comparative Example 1 | 895.1 |

Through Table 1, it was identified that Examples had excellent initial discharge capacity compared to Comparative Example. Specifically, when referring to FIG. 7, initial discharge capacity in Example 1 was 1037.8 mAh/g and initial discharge capacity in Comparative Example 1 was 895.1 mAh/g, and it was seen that initial discharge capacity was greatly enhanced when differing the area of the negative electrode current collector.

The value of Example 1 was a value closer to 1672 mAh/g-sulfur, theoretical discharge capacity of a lithium-sulfur battery, which indicated an excellent result of 62% or greater with respect to theoretical capacity of sulfur.

Moreover, in changes in the charge and discharge capacity after 20 cycles, more stable results were also exhibited in Example 1 compared to Comparative Example 1. Specifically, in Comparative Example 1, a self-discharge reaction of polysulfide occurring during lithium-sulfur battery operation seriously occurred resulting in a serious decrease in the charge and discharge capacity, whereas, in Example 1, there was only a slight decrease even when charge and discharge cycles were progressed.

Through such results, it can be seen that, when reducing a form, particularly an area, of a negative electrode current collector according to the present invention, battery properties of a lithium-sulfur battery are enhanced, and a value closer to theoretical capacity of a lithium-sulfur battery is secured, and in addition thereto, self-discharge of polysulfide occurring during charge and discharge is suppressed.

REFERENCE NUMERAL

100: Electrode Assembly
10: Negative Electrode
11: Negative Electrode Current Collector
13, 13a, 13b: Negative Electrode Mixture Layer
15: Lid
20: Positive Electrode
21: Positive Electrode Current Collector
23, 23a, 23b: Positive Electrode Mixture Layer
30: Separator The positive electrode for a lithium-sulfur battery according to the present invention has, by being included in a lithium-sulfur battery, enhanced initial discharge capacity and high charge and discharge efficiency even after continuously using the battery, and therefore, may be effectively used in automotive, electronic device and other various industrial fields.

The invention claimed is:

1. An electrode assembly for a lithium secondary battery comprising:
a negative electrode having a plurality of negative electrode current collectors and negative electrode layers laminated on both sides of each negative electrode current collector;
a positive electrode having a plurality of positive electrode current collectors and positive electrode layers laminated on both sides of each positive electrode current collector; and
a separator provided between the negative electrode and the positive electrode,
wherein each of the negative electrode layers are a lithium metal sheet or a lithium alloy sheet, and has a larger area than an area of the negative electrode current collector, and
wherein each of the negative electrode layers laminated on both sides are in contact with each other in a predetermined region.

2. The electrode assembly for a lithium secondary battery of claim 1, wherein each of the negative electrode current collectors has an area of greater than 0% and less than 100% with respect to an area of each of the negative electrode layers laminated on both sides of the corresponding negative electrode current collector.

3. The electrode assembly for a lithium secondary battery of claim 1, wherein each of the negative electrode current collectors is disposed while being separated in an inner side direction from an outer circumference surface of each of the negative electrode layers laminated on both sides of the corresponding negative electrode collector.

4. The electrode assembly for a lithium secondary battery of claim 1, wherein a center line of each of the negative electrode current collectors and a center line of each of the negative electrode layers laminated on both sides of the corresponding negative electrode collector are disposed to match each other.

5. The electrode assembly for a lithium secondary battery of claim 1, wherein a width in a horizontal direction of each of the negative electrode current collectors and a width in a horizontal direction of each of the negative electrode layers laminated on both sides of the corresponding negative electrode collector satisfy the following Mathematical Formula 1:

$$0<Wc/Wm<1.0 \quad \text{[Mathematical Formula 1]}$$

wherein Wc is a width in a horizontal direction of the corresponding negative electrode current collector, and Wm is a width in a horizontal direction of each of the negative electrode layers laminated on both sides of the corresponding negative electrode collector.

6. The electrode assembly for a lithium secondary battery of claim 1, wherein a length in a vertical direction of each of the negative electrode current collectors and a length in a vertical direction of each of the negative electrode layers laminated on both sides of the corresponding negative electrode collector satisfy the following Mathematical Formula 2:

$$0<Lc/Lm<1.0 \quad \text{[Mathematical Formula 2]}$$

wherein Lc is a length in a vertical direction of the corresponding negative electrode current collector, and Lm is a length in a vertical direction of each of the negative electrode layers laminated on both sides of the corresponding negative electrode collector.

7. The electrode assembly for a lithium secondary battery of claim 1, wherein each of the negative electrode current collectors is disposed while being separated by a certain distance from a left side end of each of the negative electrode layers laminated on both sides of the corresponding negative electrode collector, and wherein the certain distance is a left side separation distance (Dl) satisfying the following Mathematical Formula 3:

$$Dl=1-(Wc/Wm) \quad \text{[Mathematical Formula 3]}$$

wherein Dl is a left side separation distance, Wc is a width in a horizontal direction of the corresponding negative electrode current collector, and Wm is a width in a horizontal direction of each of the negative electrode layers laminated on both sides of the corresponding negative electrode collector.

8. The electrode assembly for a lithium secondary battery of claim 1, wherein each of the negative electrode current collectors is disposed while being separated by a certain distance from a right side end of each of the negative electrode layers laminated on both sides of the corresponding negative electrode collector, and wherein the certain distance is disposed so as to have a right side separation distance (Dr) satisfying the following Mathematical Formula 4:

$$Dr=1-(Wc/Wm) \quad \text{[Mathematical Formula 4]}$$

wherein Dr is a right side separation distance, Wc is a width in a horizontal direction of the corresponding negative electrode current collector, and Wm is a width in a horizontal direction of each of the negative electrode layers laminated on both sides of the corresponding negative electrode collector.

9. The electrode assembly for a lithium secondary battery of claim 1, wherein each of the negative electrode current collectors is disposed while being separated by a certain distance from an upper side end of each of the negative electrode layers laminated on both sides of the corresponding negative electrode collector, and wherein the certain distance is disposed so as to have an upper side separation distance (Du) satisfying the following Mathematical Formula 5:

$$Du=1-(Lc/Lm) \quad \text{[Mathematical Formula 5]}$$

wherein Du is an upper side separation distance, Lc is a length in a vertical direction of the corresponding negative electrode current collector, and Lm is a length in a vertical direction of each of the negative electrode layers laminated on both sides of the corresponding negative electrode collector.

10. The electrode assembly for a lithium secondary battery of claim 1, wherein each of the negative electrode current collectors is disposed while being separated by a certain distance from a lower side end of each of the negative electrode layers laminated on both sides of the corresponding negative electrode collector, and wherein the certain distance is disposed so as to have a lower side separation distance (Dd) satisfying the following Mathematical Formula 6:

$$Dd=1-(Lc/Lm) \quad \text{[Mathematical Formula 6]}$$

wherein Dd is a lower side separation distance, Lc is a length in a vertical direction of the corresponding negative electrode current collector, and Lm is a length in a vertical direction of each of the negative electrode layers laminated on both sides of the corresponding negative electrode collector.

11. The electrode assembly for a lithium secondary battery of claim 1, wherein each of the negative electrode current collectors or each of the positive electrode current collectors includes one selected from the group consisting of stainless steel, aluminum, nickel, titanium, baked carbon, copper or stainless steel of which surface is treated with carbon, nickel, titanium or silver, aluminum-cadmium alloys and combinations thereof.

12. The electrode assembly for a lithium secondary battery of claim 1, wherein each of the positive electrode layers include sulfur.

13. A lithium secondary battery comprising:
an electrode assembly;
a non-aqueous electrolyte impregnating the electrode assembly; and
a battery case embedding the electrode assembly and the non-aqueous electrolyte,
wherein the electrode assembly is the electrode assembly of claim 1.

14. The lithium secondary battery of claim 13, wherein the lithium secondary battery is a jelly-roll type, a stack type, a stack-folding type or a lamination-stack type.

15. The lithium secondary battery of claim 13, wherein the lithium secondary battery is a lithium-sulfur battery.

16. A battery module comprising the lithium secondary battery of claim 14.

17. The electrode assembly for a lithium secondary battery of claim 1, wherein the negative electrode current collectors are spaced from each other.

18. The electrode assembly for a lithium secondary battery of claim 1, wherein edges of the negative electrode layers are not enclosed by the separator.

* * * * *